US010376769B2

(12) United States Patent
Silva et al.

(10) Patent No.: US 10,376,769 B2
(45) Date of Patent: Aug. 13, 2019

(54) METHOD AND SYSTEM OF A TRAINING AID TO LEARN TO CATCH

(71) Applicants: Christopher Anthony Silva, Manahawkin, NJ (US); Christopher Stewart Silva, Sweetwater, NJ (US); Brian Zeck, Sweetwater, NJ (US); John Mccoll, Galloway, NJ (US)

(72) Inventors: Christopher Anthony Silva, Manahawkin, NJ (US); Christopher Stewart Silva, Sweetwater, NJ (US); Brian Zeck, Sweetwater, NJ (US); John Mccoll, Galloway, NJ (US)

( * ) Notice: Subject to any disclaimer, the term of this patent is extended or adjusted under 35 U.S.C. 154(b) by 754 days.

(21) Appl. No.: 14/477,299

(22) Filed: Sep. 4, 2014

(65) Prior Publication Data

US 2016/0067587 A1 Mar. 10, 2016

(51) Int. Cl.
*G09B 19/00* (2006.01)
*A63B 71/14* (2006.01)
*A63B 69/00* (2006.01)
*A63B 102/18* (2015.01)

(52) U.S. Cl.
CPC ........ *A63B 71/143* (2013.01); *A63B 69/0002* (2013.01); *A63B 2069/0011* (2013.01); *A63B 2102/182* (2015.10); *A63B 2208/12* (2013.01); *A63B 2209/10* (2013.01); *G09B 19/00* (2013.01); *G09B 19/0038* (2013.01)

(58) Field of Classification Search
CPC .............. A63B 71/143; A63B 69/0002; A63B 2069/0011
USPC ........................................................ 434/247
See application file for complete search history.

(56) References Cited

U.S. PATENT DOCUMENTS

| 4,651,345 A | * | 3/1987 | Latina | A63B 71/143 2/19 |
| 4,836,554 A | * | 6/1989 | Robbins | A63B 67/20 273/DIG. 30 |
| 4,860,385 A | * | 8/1989 | Zidele | A41D 19/00 2/163 |
| 6,006,358 A | * | 12/1999 | Keating | A63B 71/148 2/161.1 |
| 6,447,464 B1 | * | 9/2002 | Dunlevy | A61H 1/0285 2/159 |
| 2003/0024030 A1 | * | 2/2003 | Leumi | A41D 19/01552 2/159 |

OTHER PUBLICATIONS

"Rawlings Fast Pitch Series FP110PC Baseball Glove," Rawlings, https://www.amazon.com/Rawlings-Pitch-FP110PC-Baseball-11-Inch/product-reviews/B002UZ7H90, Aug. 24, 2010.*
"The Wrong Way to Wear Your Glove?" Coach Lisle, checkswing.com, http://www.checkswing.com/profiles/blogs/the-wrong-way-to-wear-your, Feb. 28, 2010.*

* cited by examiner

*Primary Examiner* — James B Hull
(74) *Attorney, Agent, or Firm* — Porzio Bromberg & Newman P.C.

(57) ABSTRACT

A method and system of a training aid to assist a user to learn to catch including a pair of gloves in which at least a portion of an outer surface of a trainee's glove is attached to at least a portion of an inner surface of a trainer's glove to allow the trainer to guide the trainee's glove into proper positions used during catching. Alternatively, a belt portion is attached around the thumb and pinky of the trainee's glove and trainer's glove to attach the gloves to one another.

4 Claims, 6 Drawing Sheets

METHOD AND SYSTEM OF A TRAINING AID TO LEARN TO CATCH

BACKGROUND OF THE INVENTION

Field of the Invention

The present invention relates a method and system of a training aid to assist a user to learn to catch including a pair of gloves in which an outer portion of a trainee's glove is attached to an inner portion of a trainer's glove to allow the trainer to guide the trainee's glove into proper positions used during catching.

Description of Related Art

One of the biggest challenges for any young athlete is learning the eye hand coordination to catch a ball such as a football or a baseball. Children take some time to learn how to position their hands or glove to catch in the appropriate position. It is desirable to provide a training device to allow a trainer to guide a trainee's hands into proper positions used during catching.

Summary of the Invention

The present invention relates to a method and system of a training aid to assist a user to learn to catch. The present invention allows a trainee, such as a child, to act almost as a puppet of a trainer.

The system can include a pair of gloves in which at least a portion of an outer surface of a trainee's glove is attached to at least a portion of an inner surface of a trainer's glove to allow the trainer to guide the trainee's glove into proper positions used during catching. The present invention can include multiple embodiments to allow for the trainer to guide the trainee's hand or hands to a correct position. In one embodiment, the system includes gloves in which at least one glove is worn by the trainer and at least one glove is worn by the trainee. The gloves can be for example tight fitting athletic style gloves, such as baseball batting gloves. A first connection area is affixed to an inner surface of the trainer's glove. For example the connection area can include the palm and inner surface of one or more digits of the trainer's glove. A second connection area is affixed to an outer surface of the trainee's glove. For example, the second connection area can be on the back of a hand portion and an outer surface of one or more digits of the trainee's glove. The first connection area can include a first connection member. The second connection areas can include a second connection member. For example the first connection member and the second connection member can be adhesion connection members, such as for example a hook or loop connector or another pliable fastening method for connecting the first connection area to the second connection area. Accordingly, the first connection area of the trainer's glove is opposite of the second connection area of the trainer's glove, to allow a temporary connection between the gloves.

To use, the trainer and the trainee put on their respective gloves, and the palm side of the at least one glove of the trainer connects to the back side of the at least one glove of the trainee. The trainer can then perform the catching motion for the trainee with varying degrees of assistance, to allow the trainee to feel the movement of catching themselves.

In another embodiment, a trainer glove includes a first connection area around an inner surface of a thumb and pinky of the trainer glove. The thumb and pinky can have an extended surface area. The trainee glove includes a second connection area around the thumb and pinky of the trainee glove. The trainee glove can be a baseball or softball glove. In one embodiment, the second connection area extends at least on the inner surface of the thumb and pinky. The first connection area can include a first connection member. The second connection areas can include a second connection member. For example the first connection member and the second connection member can be adhesion connections members, such as a hook or loop connector or another pliable fastening method for connecting the first connection area to the second connection area. The first connection area can fasten around the thumb and pinky of the second connection area on the softball or baseball mitt to provide a temporary connection and allow the trainer to move the thumb and pinky of the trainee's glove while the trainee is still wearing it, and apply appropriate pressure to close the trainee's glove when the ball is received in the trainee's glove.

In one embodiment, a second glove is worn by the trainee and the trainer on the opposite hand. A first connection area is affixed to an inner surface of the trainer's second glove. For example the connection area can include the palm and inner surface of one or more digits of the trainer's second glove. A second connection area is affixed to an outer surface of the trainee's second glove. The first connection area can fasten to the second connection area to provide a temporary connection and allow the trainer to move the second glove while the trainee is still wearing it over the trainee glove which catches the ball to teach covering the trainee glove with the second hand for teaching a two handed catch.

The invention will be more fully described by reference to the following drawings.

DETAILED DESCRIPTION

Figure 1:
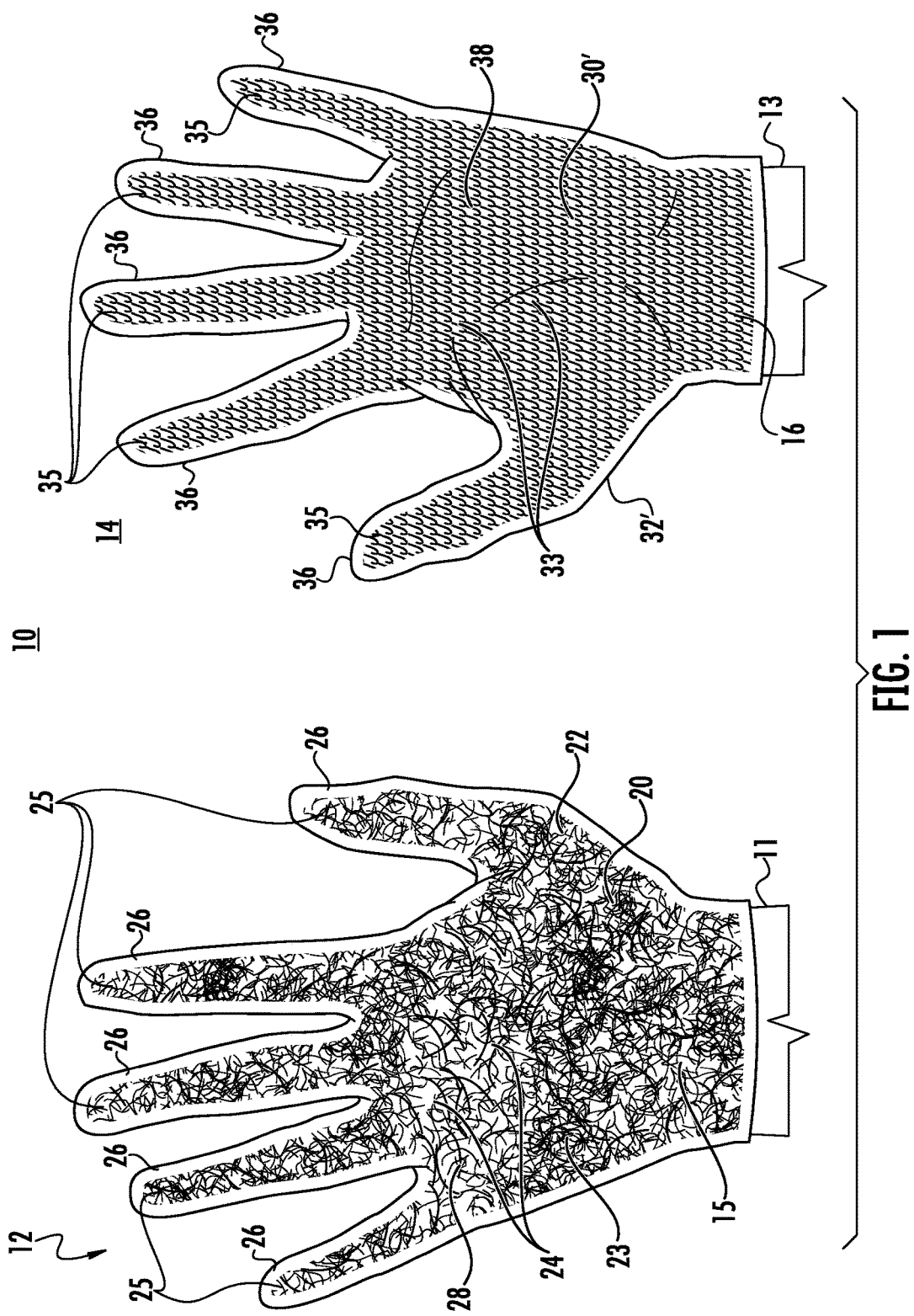
FIG. 1 is a schematic diagram of a system of a training aid to assist a user to learn to catch having the glove of the trainee shown from the top and the glove of the trainer shown from the bottom in accordance with the teachings of the present invention.

Reference will now be made in greater detail to a preferred embodiment of the invention, an example of which is illustrated in the accompanying drawings. Wherever possible, the same reference numerals will be used throughout the drawings and the description to refer to the same or like parts.

Figure 2:
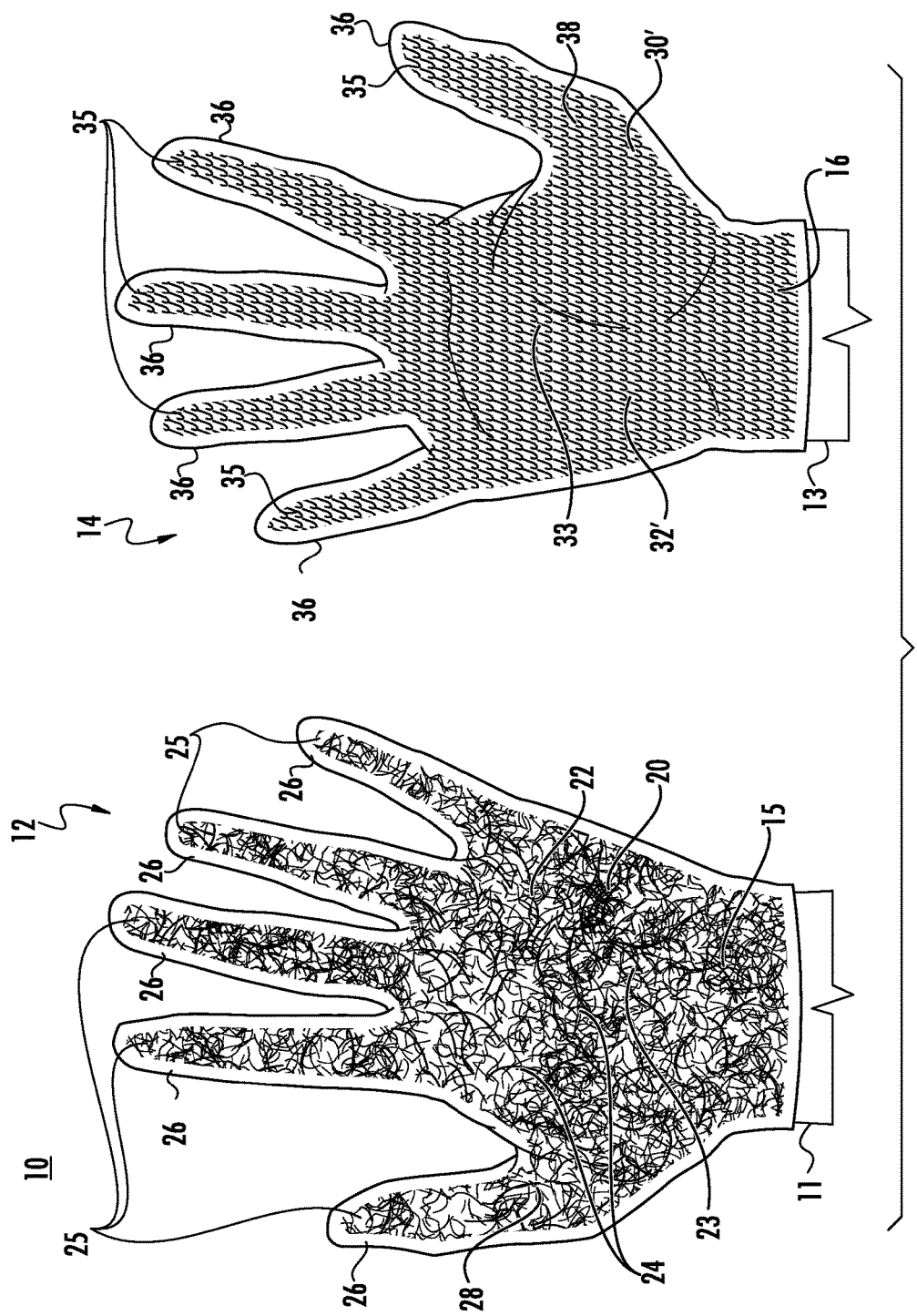
FIG. 2 is a schematic diagram of a system of a training aid to assist a user to learn to catch having the glove of the trainee shown from the top and the glove of the trainer shown from the bottom in accordance with the teachings of the present invention.

FIG. 1 illustrates system 10 of a training aid to assist a user to learn to catch in accordance with the teachings of the present invention. System 10 include a pair of gloves. Trainee's glove 12 is worn by trainee 11 and trainer's glove 14 is worn by trainer 13. In this embodiment trainee's glove 12 is worn on the left hand of trainee 11 and trainer's glove 14 is worn on the left hand of trainer 13. In an alternate embodiment, trainee's glove 12 is worn on the right hand of trainee 11 and trainer's glove 14 is worn on the right hand of trainer 14 as shown in FIG. 2. In one embodiment, trainee's glove 12 can be worn on both hands of trainee 11 and trainer's glove 14 can be worn on both hands of trainee 13.

Trainee's glove 12 and trainer's glove 14 can be formed of a tight fitting athletic style gloves, such as baseball batting gloves. For example trainee's glove 12 and trainer's glove 14 can be formed of an elastic material such as for example 2-WAY SPANDEX™®, a synthetic fiber known for its exceptional elasticity.

Outer portion 15 of a trainee's glove 12 is removably attached to inner portion 16 of trainer's glove 14 to allow trainer 13 to guide trainee's glove 12 worn by trainee 11 into proper positions used during catching. First connection area 20 is affixed to outer portion 22 of trainee's glove 12. For example, first connection area 20 can include backside portion 24 of palm 23 and outer surface 25 of digits 26 of trainee's glove 22. Second connection area 30 is affixed to inner portion 32 of trainer's glove 14. For example second connection area 30 can include palm 33 and inner surface 35 of the digits 36 of trainer's glove 14. First connection area 20 can include first connection member 28. Second connection area 30 can include a second connection member 38. For example the first connection member 28 and second connection member 38 can be formed of a respective hook or loop connector for attaching first connection member 28 to second connection member 38. In an alternate embodiment first connection member 28 and second connection member 38 are formed of an alternate pliable fastening method.

Figure 3:
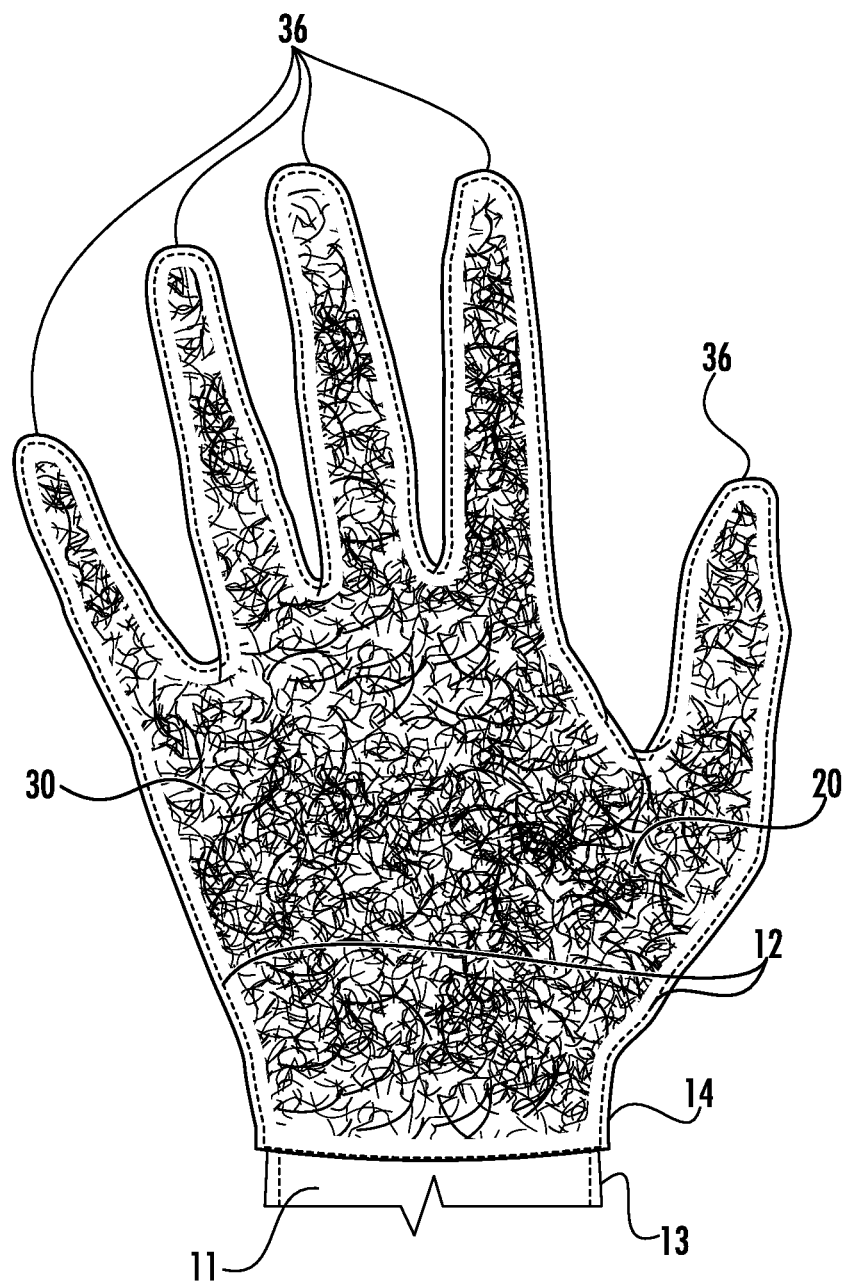
FIG. 3 is a schematic diagram of a system of a training aid to assist a user to learn to catch in accordance with the teachings of the present invention after adherence of the trainer's glove to the trainee's glove.

First connection area 20 of trainee's glove 12 is positioned opposite of second connection area 30 of trainer's glove 14, to allow a temporary connection between the trainee's glove 12 and trainer's glove 14s. To use, trainee 11 puts on trainee's glove 12 and trainer 13 puts on the trainer's glove 14. First connection area 20 connects to second connection area 30 as shown in FIG. 3. Trainer 13 can then perform the catching motion for trainee 11 with varying degrees of assistance to allow trainee 11 to feel the movement of catching. In one embodiment, trainee's glove 12 and trainer's glove 14 form a kit.

Figure 4:
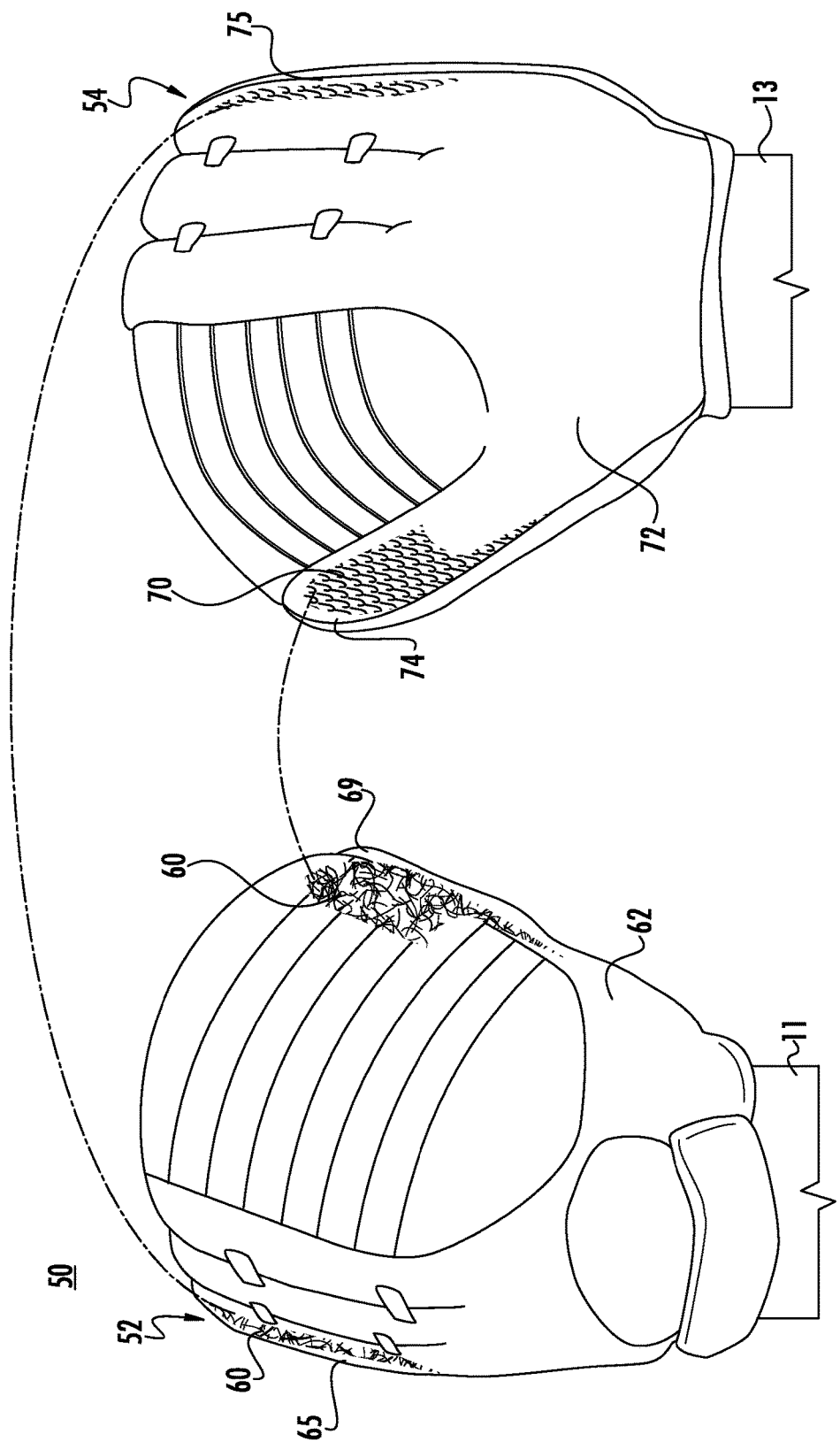
FIG. 4 is a schematic diagram of an alternate embodiment of a system of a training aid to assist a user to learn to catch having the glove of the trainee shown from the top and the glove of the trainer shown from the bottom in accordance with the teachings of the present invention.

FIG. 4 illustrates system 50 of a training aid to assist a user to learn to catch in accordance with the teachings of the present invention. Trainee's glove 52 is worn by trainee 11 and trainer's glove 54 is worn by trainer 13. In this embodiment trainee's glove 52 is worn on the left hand of trainee 11 and trainer's glove 54 is worn on the left hand of trainer 13. In an alternate embodiment, trainee's glove 52 is worn on the right hand of trainee 11 and trainer's glove 54 is worn on the right hand of trainer 13 (not shown). Trainee's glove 52 is a baseball or softball glove. Trainee's glove 52 includes first connection area 60 affixed to outer portion 62 of trainee's glove 52. First connection area 60 can be positioned around thumb 64 and pinky 65 of trainee's glove 52. Trainer's glove 54 includes second connection area 70 affixed to inner portion 72 of trainer's glove 54. Second connection area 70 can extend around thumb 74 and pinky 75 of trainer's glove 54. During use, second connection area 70 can fasten around thumb 64 and pinky 65 of first connection area 60 to provide a temporary connection and allow trainer 13 to move the trainee's gloves while trainee 11 is wearing it, and apply appropriate pressure to close the trainee's glove 52 when a ball is received in trainee's glove 52.

Figure 5A:
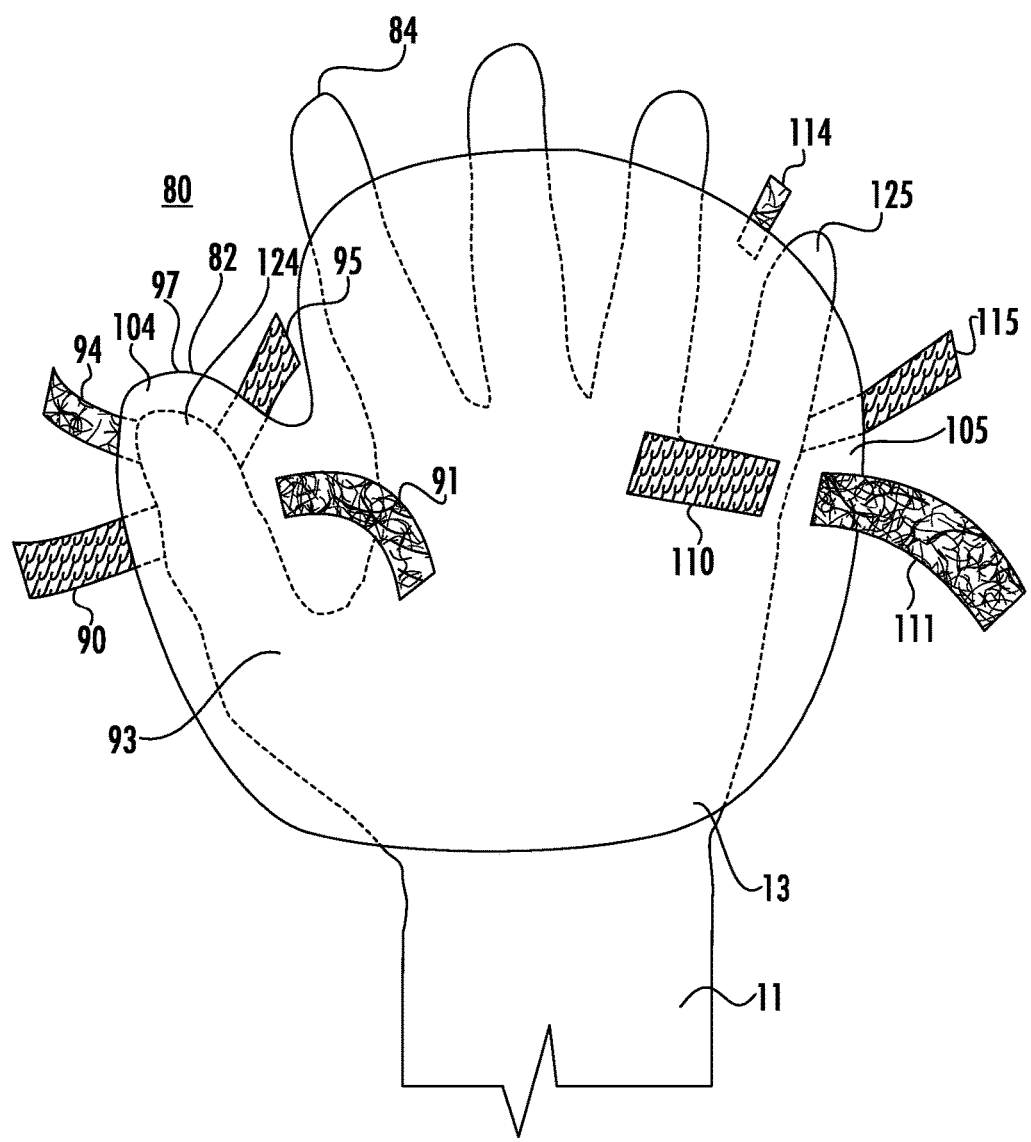
FIGS. 5A is a schematic diagram of an alternate embodiment of a system of a training aid to assist a user to learn to catch before connection.
Figure 5B:
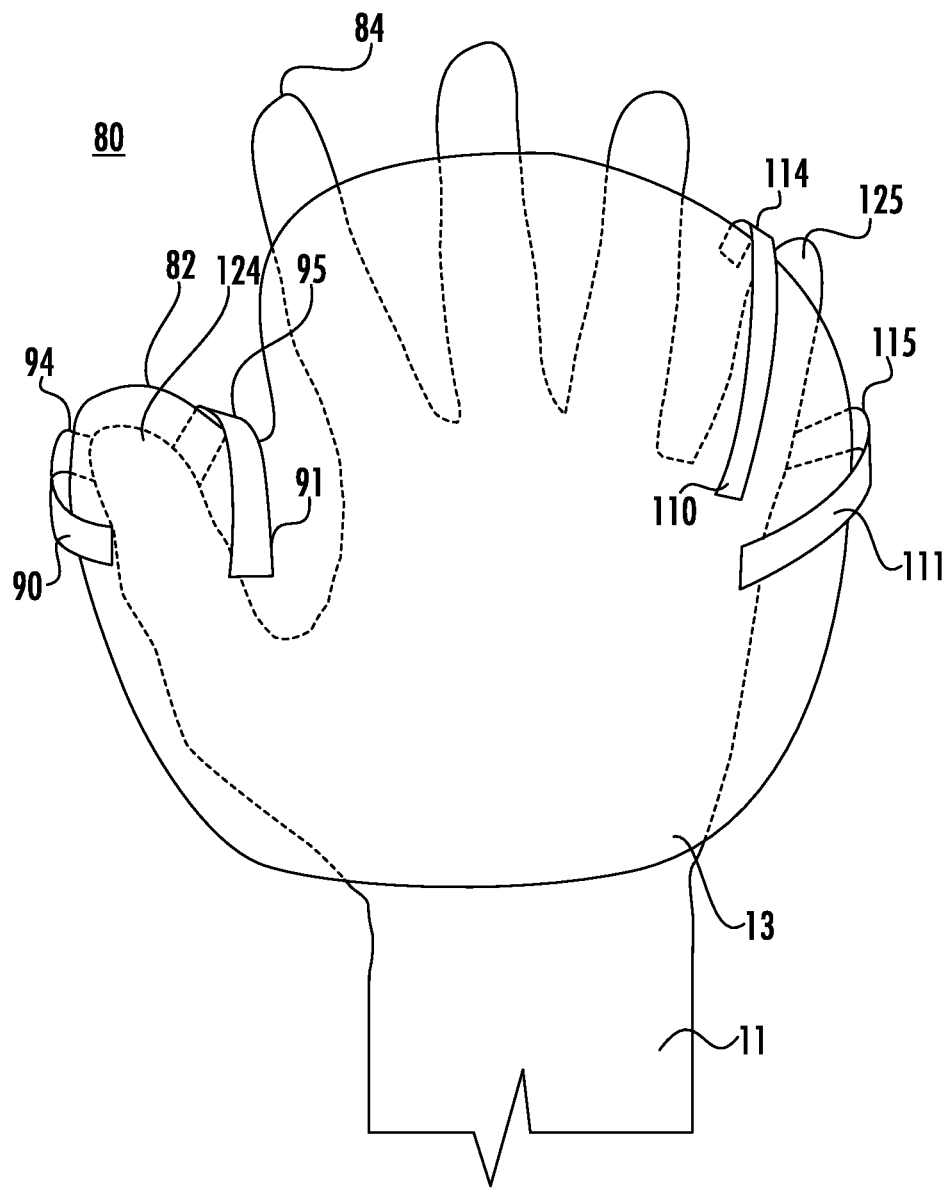
FIGS. 5B is a schematic diagram of the system of a training aid to assist a user to learn to catch after connection.

FIGS. 5A-B illustrate system 80 of a training aid to assist a user to learn to catch in accordance with the teachings of the present invention. Trainee's glove 82 is worn by trainee 11 and trainer's glove 84 is worn by trainer 13. In this embodiment trainee's glove 82 is worn on the left hand of trainee 11 and trainer's glove 84 is worn on the left hand of trainer 13. In an alternate embodiment, trainee's glove 82 is worn on the right hand of trainee 11 and trainer's glove 84 is worn on the right hand of trainer 13 (not shown). Trainee's glove 82 is a baseball or softball glove.

Belt portion 90 and belt portion 91 can be attached to inner portion 93 of trainee's glove 82 adjacent thumb 104 of trainee's glove 82. Belt portion 94 and belt portion 95 can be attached to outer portion 97 adjacent thumb 104 of trainee's glove 82. Belt portion 90 can be formed of a hook material and belt portion 94 can be formed of a loop material. Belt portion 91 can be formed of a loop material and belt portion 95 can be formed of a hook material. In alternate embodiments, belt portions 90, 91, 94 and 95 can be formed of the opposite hook and loop material.

Belt portion 110 and belt portion 111 can be attached to inner portion 93 of trainee's glove 82 adjacent pinky 105 of trainee's glove 82. Belt portion 114 and belt portion 115 can be attached to outer portion 97 adjacent pinky 105 of trainee's glove 82. Belt portion 110 can be formed of a hook material and belt portion 114 can be formed of a loop material. Belt portion 111 can be formed of a loop material and belt portion 115 can be formed of a hook material. In alternate embodiments, belt portions 110, 111, 114 and 115 can be formed of the opposite hook and loop material.

During use as shown in FIG. 5B, belt portion 90 and belt portion 94 can attach around thumb 104 of trainee's glove 82 and thumb 124 of trainer's glove 84. Belt portion 91 and belt portion 95 can attach around thumb 104 of trainee's glove 82 and thumb 124 of trainer's glove 84. Belt portion 110 and belt portion 114 can attach around pinky 105 of trainee's glove 82 and pinky 125 of trainer's glove 82. Belt portion 111 and belt portion 115 can attach around pinky 105 of trainee's glove 82 and pinky 125 of trainer's glove 82 to provide a temporary connection and allow trainer 13 to move the trainee's gloves while trainee 11 is wearing it, and apply appropriate pressure to close the trainee's glove 82 when a ball is received in trainee's glove 82.

It is to be understood that the above-described embodiments are illustrative of only a few of the many possible specific embodiments, which can represent applications of the principles of the invention. Numerous and varied other arrangements can be readily devised in accordance with these principles by those skilled in the art without departing from the spirit and scope of the invention.

What is claimed is:

1. A system of a training aid to assist a trainee to learn to catch consisting of:
    a first glove configured to be received on a hand of the trainee, wherein said first glove is a baseball or softball mitt, the first glove having a first connection area positioned on at least a portion of an outer surface of the first glove, wherein said first connection area includes an outer surface of a thumb and an outer surface of a pinky of the first glove; and a second glove configured to be received on a hand of a trainer, the second glove having a second connection area positioned on at least a portion of an inner surface of the second glove, wherein said second connection area includes an inner surface of a thumb and an inner surface of a pinky of the second glove, said first connection area and said second connection area are formed of an adhesion material, wherein said first connection area can be removably attached to said second connection area to connect the first glove received on the hand of the trainee with the second glove received on the hand of the trainer being configured for assisting the trainee to learn to catch in which the trainer can manipulate the thumb and the pinky of the first glove.

2. The system of claim 1 wherein said adhesion material is formed of a hook and loop material.

3. A system of a training aid to assist a trainee to learn to catch consisting of:

a first glove configured to be received on a hand of the trainee, wherein said first glove is a baseball or softball mitt, the first glove having a first connection area positioned on at least a portion of an outer surface of the first glove, wherein said first connection area includes an outer surface of a thumb and an outer surface of a pinky of the first glove, and a second glove configured to be received on a hand of a trainer, the second glove having a second connection area positioned on at least a portion of an inner surface of the second glove, wherein said second connection area includes an inner surface of a thumb and an inner surface of a pinky of the second glove, and first connection area and said second connection area are formed of an adhesion material, said first connection area includes a backside portion of a palm of the first glove, wherein said first connection area can be removably attached to said second connection area to connect the first glove received on the hand of the trainee with the second glove received on the hand of the trainer being configured for assisting the trainee to learn to catch in which the trainer can manipulate the thumb and the pinky of the first glove.

4. A system of a training aid to assist a trainee to learn to catch consisting of:

a first glove configured to be received on a hand of the trainee, wherein said first glove is a baseball or softball mitt, the first glove having a first connection area positioned on at least a portion of an outer surface of the first glove, wherein said first connection area includes an outer surface of a thumb and an outer surface of a pinky of the first glove; and a second glove configured to be received on a hand of a trainer, the second glove having a second connection area positioned on at least a portion of an inner surface of the second glove, wherein said second connection area includes an inner surface of a thumb and an inner surface of a pinky of the second glove, said first connection area and said second connection area are formed of an adhesion material, said second connection area includes a palm of the second glove, wherein said first connection area can be removably attached to said second connection area to connect the first glove received on the hand of the trainee with the second glove received on the hand of the trainer being configured for assisting the trainee to learn to catch in which the trainer can manipulate the thumb and the pinky of the first glove.

* * * * *